Patented Jan. 1, 1935

1,986,322

UNITED STATES PATENT OFFICE 1,986,322

METHOD OF PURIFYING A MIXTURE OF ACETALDEHYDE AND ACETIC ANHYDRIDE

Louis Victor Clouzeau, Meudon-val-Fleury, France, assignor to E. I. du Pont de Nemours & Company, Wilmington, Del., a corporation of Delaware No Drawing. Application September 10, 1929, Serial No. 391,699. In France September 13, 1928

9 Claims. (Cl. 260—123)

This invention relates to a process of treating ethylidene diacetate. More particularly it relates to a process of producing acetaldehyde and acetic anhydride free from any substances usually present when ethylidene diacetate is split in the presence of a halogen compound, and which have a tendency to cause the acetaldehyde to polymerize after standing for a few days.

In U. S. Patent No. 1,579,248 there is described a process for the manufacture of acetic anhydride and acetaldehyde by splitting ethylidene diacetate. In that process the splitting operation is carried out in the presence of a catalyst and/or small quantities of halogen derivatives of zinc or a compound or substance capable of producing the halogen derivative in the presence of zinc. According to the process described in the above-mentioned patent, in the course of the reaction the halogen is gradually combined or admixed with the anhydride and aldehyde vapors produced and passes therewith from the splitting apparatus. The halogen which thus escapes with the vapors is to a great extent but not completely removed by passing said vapors over zinc shavings or the like.

In the above-referred to patent it is stated that it is advantageous to carry out fractional condensations of the vapors (which are distilled), and the examples therein set forth describe methods of producing this fractional condensation. When the fractional condensation of the vapors is performed as set forth in this patent, the aldehyde thus produced frequently polymerizes after standing for some days. The polymerization may sometimes occur in the aldehyde and anhydride separation column, in which case it condenses the anhydride. This polymerization is probably due to the presence of some of the halogen or other substances which were not removed by the zinc.

I have found that I can positively prevent any polymerization of the acetaldehyde by conducting the acetaldehyde and acetic anhydride vapors, prior to their condensation, over various reagents which react with and completely remove, the halogen or other ingredients present in the vapors and which tend to cause the acetaldehyde to polymerize on standing.

It is therefore an object of this invention to provide a method of producing acetaldehyde and acetic anhydride by splitting ethylidene diacetate in the presence of a halogen compound or other volatile substances, which comprises removing the halogen or other volatile substances escaping with the acetaldehyde and acetic anhydride vapors, whereby subsequent polymerization of the acetaldehyde is prevented.

Another object of this invention is to provide a method of producing acetaldehyde and acetic anhydride by splitting ethylidene diacetate in the presence of a halogen compound or other volatile substance and in which the vapors containing the volatile compounds or halogens are brought in contact with the acetates of the alkali metals, alkaline earth metals or organic bases.

An additional object of this invention comprises a method of producing acetaldehyde and acetic anhydride from ethylidene diacetate in the presence of a halogen compound or other volatile compound and conducting vapors through a non-aqueous solution including a potassium salt, such as the acetate, whereby the halogen or other volatile compound is removed.

Additional objects will appear from the following description and appended claims.

In carrying out the method, ethylidene diacetate in the presence of a catalyst and/or halogen compound such as zinc bromide is treated in the usual manner to effect a splitting thereof, whereby vapors of acetaldehyde and acetic anhydride are produced. The vapors arising or removed from the splitting apparatus usually contain some halogen with or without other volatile ingredients, which tend to cause the polymerization of the acetaldehyde. Prior to the condensation of the vapors, they are conducted across or through a suitable apparatus containing a compound which reacts with the undesirable ingredients present therein, thereby removing them and eliminating the cause of polymerization of the acetaldehyde.

Various compounds may be used to eliminate the halogen and/or volatile substance present in the vapors withdrawn from the splitting apparatus. Organic acid salts, including those formed from an alkali metal, alkaline earth metal or an organic base combined with an organic acid, particularly the acetates of the alkali metals and alkaline earth metals or organic bases, as acetates of potassium, sodium, calcium, barium, magnesium, urea, thiourea, benzidine, acetamide, acetanilide, and sodium salicylate may be used. Since acetic acid is present in the reaction, it is evident that it is sufficient to add the base or even a weak salt of this base in order that the acetate shall be formed subsequently in the liquid. The compounds to be added may be dissolved or suspended in any suitable non-aqueous liquid medium, as, for instance, a mixture of acetic anhydride and ethylidene diacetate or acetic acid.

Solutions comprising a potassium salt, such as the acetate dissolved in a mixture of acetic anhydride and ethylidene diacetate or acetic acid, produce satisfactory results.

In cases where a solution is employed, the apparatus used may comprise a simple bubbling column containing the solution and into which the vapors are conducted. If desired, the column may be carefully insulated or even slightly heated in such a manner that the solution therein may be maintained at approximately the same temperature as the vapors which contact or pass through it. After the vapors have contacted with the solution, they may be condensed in the usual manner, for example, by fractional condensation, whereby the acetaldehyde and acetic anhydride are separated.

In the present process the potassium salt or other compound used reacts with the halogen compound carried by the vapors withdrawn from the splitting apparatus, simultaneously liberating the free organic acid.

The process described above produces acetaldehyde which has no tendency to polymerize. This product is relatively stable. It may stand for several days without changing its condition.

It is to be understood that the process described above, though specifically referring to the separation or elimination of halogens present in vapors produced by splitting ethylidene diacetate in the presence of halogen compounds, is not limited thereto. The process may be advantageously applied in the splitting of ethylidene diacetate in all cases where the catalyst or other compounds used produce volatile substances tending to polymerize the acetaldehyde.

I claim:

1. In a method of preparing acetaldehyde and acetic anhydride by splitting ethylidene diacetate in the presence of a halogen compound, the step of treating the vapors with a salt having the formula RR' wherein R designates acetic acid or the acetic acid radical and R' designates an alkali metal, an alkaline earth metal or an organic base.

2. In a method of preparing acetaldehyde and acetic anhydride by splitting ethylidene diacetate in the presence of a halogen compound, the step of treating the vapors with a non-aqueous solution of a salt having the formula RR' wherein R designates acetic acid or the acetic acid radical and R' designates an alkali metal, an alkaline earth metal or an organic base.

3. In a method of preparing acetaldehyde and acetic anhydride by splitting ethylidene diacetate in the presence of a halogen compound, the step of treating the vapors with a non-aqueous solution of a salt having the formula RR' wherein R designates acetic acid or the acetic acid radical and R' designates an alkali metal, an alkaline earth metal or an organic base, in a liquid medium comprising a substance of the class consisting of acetic acid and its anhydride.

4. In a method of preparing acetaldehyde and acetic anhydride by splitting ethylidene diacetate in the presence of a halogen compound, the step of treating the vapors with a non-aqueous solution of a salt having the formula RR' wherein R designates acetic acid or the acetic acid radical and R' designates an alkali metal, an alkaline earth metal or an organic base, in a liquid medium comprising ethylidene diacetate and a substance of the class consisting of acetic acid and its anhydride.

5. In a method of preparing acetaldehyde and acetic anhydride by splitting ethylidene diacetate in the presence of a halogen compound, the step of treating the vapors with a non-aqueous solution of a salt having the formula RR' wherein R designates acetic acid or the acetic acid radical and R' designates an alkali metal, an alkaline earth metal or an organic base, and maintained at a temperature substantially the same as the vapors contacting therewith.

6. In a method of preparing acetaldehyde and acetic anhydride by splitting ethylidene diacetate in the presence of a halogen compound, the step of treating the vapors with a non-aqueous solution of a salt having the formula RR' wherein R designates acetic acid or the acetic acid radical and R' designates an alkali metal, an alkaline earth metal or an organic base, in a liquid medium comprising a substance of the class consisting of acetic acid and its anhydride, and maintained at a temperature substantially the same as the vapors contacting therewith.

7. In a method of preparing acetaldehyde and acetic anhydride by splitting ethylidene diacetate in the presence of a halogen compound, the step of treating the vapors with a non-aqueous solution of a salt having the formula RR' wherein R designates acetic acid or the acetic acid radical and R' designates an alkali metal, an alkaline earth metal or an organic base, in a liquid medium comprising ethylidene diacetate and a substance of the class consisting of acetic acid and its anhydride, and maintained at a temperature substantially the same as the vapors contacting therewith.

8. In a method of preparing acetaldehyde and acetic anhydride by splitting ethylidene diacetate in the presence of a halogen compound, the step of bringing the vapors in contact with a non-aqueous solution of potassium acetate.

9. In a method of preparing acetaldehyde and acetic anhydride by splitting ethylidene diacetate in the presence of a halogen compound, the step of bringing the vapors in contact with a non-aqueous solution of potassium acetate maintained at a temperature substantially the same as the vapors contacting therewith.

LOUIS VICTOR CLOUZEAU.